US006599114B1

(12) United States Patent
Cassani

(10) Patent No.: US 6,599,114 B1
(45) Date of Patent: Jul. 29, 2003

(54) DEVICE FOR FORMING CERAMIC TILES, INCLUDING THOSE OF LARGE DIMENSIONS

(75) Inventor: Giuseppe Cassani, Imola (IT)

(73) Assignee: Sacmi-Cooperativa Meccanici Imola - S.C.R.L., Imola (IT)

( * ) Notice: Subject to any disclaimer, the term of this patent is extended or adjusted under 35 U.S.C. 154(b) by 0 days.

(21) Appl. No.: 09/449,492

(22) Filed: Nov. 29, 1999

Related U.S. Application Data

(62) Division of application No. 09/124,038, filed on Jul. 29, 1998, now Pat. No. 6,027,675.

(30) Foreign Application Priority Data

Aug. 1, 1997 (IT) ........................................ RE97A0058

(51) Int. Cl.[7] ................................................ B29C 43/32
(52) U.S. Cl. ........................ 425/356; 425/419; 425/421
(58) Field of Search ................................ 425/419, 421, 425/456, 356, 412

(56) References Cited

U.S. PATENT DOCUMENTS

| | | | | | |
|---|---|---|---|---|---|
| 1,012,835 | A | | 12/1911 | Frerichs | |
| 2,618,883 | A | | 11/1952 | Adams | |
| 2,888,715 | A | | 6/1959 | Frank | |
| 3,671,618 | A | | 6/1972 | Huber et al. | |
| 3,717,693 | A | | 2/1973 | Kohl et al. | |
| 3,816,052 | A | * | 6/1974 | Schoppee et al. | 425/406 |
| 4,341,510 | A | * | 7/1982 | Croseck et al. | 425/149 |
| 4,690,666 | A | * | 9/1987 | Alexander et al. | 493/152 |
| 5,037,287 | A | | 8/1991 | Hirai | |
| 5,176,922 | A | * | 1/1993 | Balsano et al. | 425/89 |
| 5,238,375 | A | * | 8/1993 | Hirai | 425/77 |
| 5,242,641 | A | * | 9/1993 | Horner et al. | 264/104 |
| 5,401,153 | A | * | 3/1995 | Katagiri et al. | 425/78 |
| 5,472,334 | A | * | 12/1995 | Takahashi | 425/554 |
| 5,478,225 | A | * | 12/1995 | Takeuchi et al. | 425/78 |
| 5,498,147 | A | * | 3/1996 | Katagiri et al. | 425/78 |
| 5,551,856 | A | * | 9/1996 | Katagiri | 425/78 |
| 5,874,114 | A | | 2/1999 | Schrofele | |
| 6,099,772 | A | * | 8/2000 | Hinzmann et al. | 264/109 |
| 6,113,378 | A | * | 9/2000 | Tsuboi et al. | 425/352 |

FOREIGN PATENT DOCUMENTS

| | | | |
|---|---|---|---|
| DE | 1271614 | B | 6/1968 |
| DE | 2155571 | A | 5/1973 |
| EP | 0556163 | A | 8/1993 |
| FR | 338364 | A | 5/1904 |
| FR | 2662381 | A | 11/1991 |
| IT | 1257658 | B | 2/1996 |

* cited by examiner

*Primary Examiner*—W. L. Walker
*Assistant Examiner*—Emmanuel Luk
(74) *Attorney, Agent, or Firm*—Birch, Stewart, Kolasch & Birch, LLP

(57) ABSTRACT

A method and system for forming ceramic tiles, including those with large dimensions, which includes the following stages: loading a powder to be pressed into a mould cavity; exerting an initial pressure on the entire surface of the powder present in the mold cavity; releasing the initial pressure; exerting the compacting pressure on the entire surface of the powder contained in the mold cavity; increasing the pressure on a first portion of the surface of the powder contained in the mold cavity up to a value permitted by the press capacity; releasing the pressure on said first portion of the surface of the powder contained in the mold cavity and increasing the compacting pressure on a second portion of the surface of the powder contained in the mold cavity; alternating the exertion of pressure on said first portion and on said second portion; and interrupting the exertion of pressure.

3 Claims, 9 Drawing Sheets

DEVICE FOR FORMING CERAMIC TILES, INCLUDING THOSE OF LARGE DIMENSIONS

This application is a divisional of application Ser. No. 09/124,038, filed on Jul. 29, 1998, now U.S. Pat. No. 6,027,675, contents of which are hereby incorporated by reference.

BACKGROUND OF THE INVENTION

Ceramic tiles are commonly formed by pressing material in powder form, of between 1% and 10% moisture content, within a mould. This forming method is commonly known as dry forming. The soft material is loaded into the mould by known means. After the mould has been closed by punches operated by the pressing members, the powder undergoes initial light pressing, with consequent volume reduction, facilitating powder deaeration. The inital light pressing, also known as a first pressing, is followed by the deaeration stage, during which pressing is interrupted and the could is sometimes reopened to allow the air to escape. The light pressing subjects the powder to a pressure which is about one tenth of the pressing pressure. This is followed by the main pressing to a pressure of about 400 $kg/cm^2$, which ensures perfect powder compaction. The main pressing generally takes place in several successive steps at increasing pressure up to the maximum pressure. The thrust exerted by the upper cross-member of the press is distributed over the total surface of the tiles pressed during each cycle.

It should be noted that each time reference is made to the term "pressure" in the text, this unless otherwise specified means the compacting pressure to which the powder is subjected within the forming mould. The largest currently available presses have a capacity (pressing force) of 4000 tonnes, and during each cycle are able to press a surface area of not exceeding 10,000 $cm^2$. Thus, for example, they can operate a die having three impressions of 54 cm×54 cm.

Tiles of large and ever larger dimensions, having sides exceeding one meter, have not been able to be formed so far by known dry processes because the capacity (pressing force) of the press required to compact the pressure would involves a structure of such dimensions as to be difficult to construct.

Large-dimension tiles having sides of the order of one meter or more are currently manufactured either by extrusion processes or by wet forming processes within hygroscopic moulds similar to those used for sanitary appliances.

Apart from the low cost effectiveness of such processes, the subsequent high-temperature firing of the material creates important problems due to the excessive or poorly distributed moisture contained in the material.

SUMMARY OF THE INVENTION

The object of this patent is to achieve dry-forming of ceramic tiles by powder compaction using compacting pressures not strictly related to the press capacity, ie to the maximum pressing force which the press can exert.

The purpose of this is to be able to manufacture, particularly but not exclusively, large-dimension tiles having for example a side dimension of the order of 100 cm using currently available pressing forces, ie presses of currently available capacity.

The present invention is also convenient for manufacturing tiles of usual dimensions using low-capacity presses, which by virtue of the invention are able to exert compaction pressures of up to 500 bar.

The method of the present invention is achieved by dividing the title surface into two or more portions, preferably of equal surface area, and pressing these portions, not simultaneously, but one at a time, in succession. It is immediately apparent that by dividing the surface to be pressed into two portions having the same area. The press capacity is halved, or for equal press capacity the powder compacting pressure is doubled.

To implement the method the mould punch must be divided into adjacent portions, preferably having the same surface area or areas of the same order of magnitude. For example such punch portions can conveniently be concentric.

The pressing cycle according to the present invention comprises the following operations.

The powder is loaded into the mould in a conventional manner, i.e. having expelled the tile the movable carriage grid carries the powder into the mould die.

A cross-member carrying the upper punch divided into portions is then lowered to close the mould. An initial light compaction, or first pressing follows.

The first pressing can be done by moving the various (for example two) portions of the punch as if the punch were in one piece. This is because the compacting pressure required for the first pressing multiplied by the total tile area certainly does not exceed the pressing force which can be exerted by the press.

In certain special cases, the first pressing can also be carried out at pulsating pressure by moving the various punch portions as if it were a one-piece punch or by alternating the pressure of the various parts of the punch.

Considering a punch divided into two portions of about equal surface area, for example concentric, as the maximum pressing force exertable by the press is achieved by pressing simultaneously with the two punch portions, part of the pressing force is applied in succession, for example firstly to the first punch portion, after which the first portion is unloaded and part of the pressing force is transferred to the second portion and so on, applying force increments of force until the entire force is applied firstly to one portion and then to the other.

As a modification, instead of applying force increments of force alternately to one portion and their to the other portion of the punch until the entire press pressing force is attained, the entire press force can be applied from the beginning, firstly to one punch portion and then to the other.

The divided punch can be the upper punch or the lower punch, or a combination of both.

The merits and the constructional and operational characteristics of the present invention will be more apparent from the description given hereinafter with reference to the accompanying drawings, which show four preferred embodiments thereof by way of non-limiting example.

DETAILED DESCRIPTION OF THE INVENTION

Figure 1:
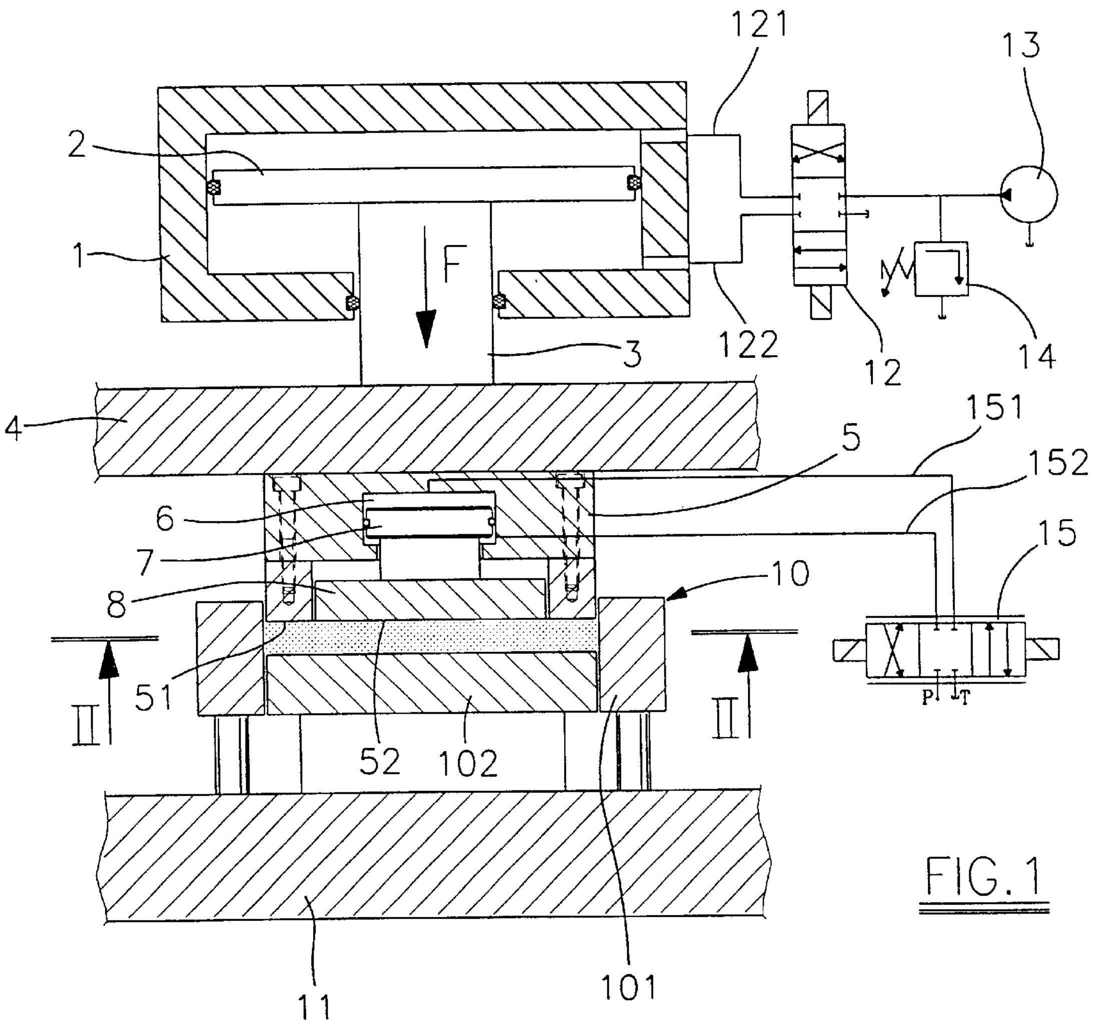
FIG. 1 is a schematic section through a first embodiment of a press with a relative mould for implementing the present invention, shown in a first operating position.
Figure 2:
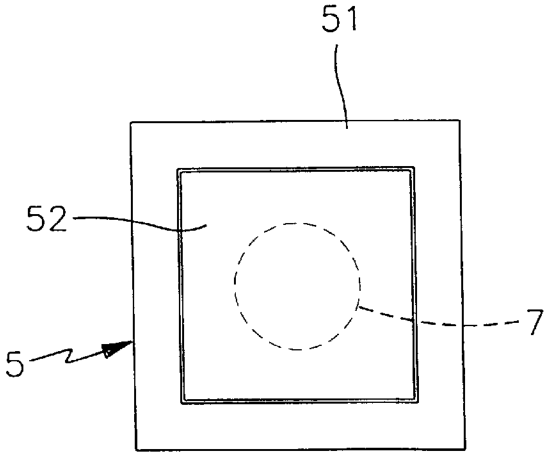
FIG. 2 is a partial view on the line II—II of FIG. 1.

FIGS. 1 to 4 show the main hydraulic press cylinder 1 within which there slides a piston 2. Attached to a rod 3 to which the movable cross-member 4 is fixed. The movable cross-member 4 carries at least one punch 5 the interior of which forms the secondary hydraulic cylinder 6 within which the piston 7 slides. The piston 7 carries a parallelepiped block 8 received in a cavity of the punch 5, and able to assume a slightly retracted position or a position slightly external to the punch 5, depending on the position of the piston 7. In this manner there is formed a punch having two portions, namely 51 defined by the border circumscribing the block 8, and 52 defined by the base of the block 8.

Below the punch 5 there is a mould 10 comprising a die 101 and a movable base 102, both supported by the press bed 11.

The main cylinder 1 is connected above and below the piston 2 to a pressurized oil source and to the outside respectively, and vice versa, by the distributor valve 12 and the pipes 121 and 122.

Between the pressurized oil source 13 and the distributor valve 12 there is provided a maximum pressure valve 14.

The secondary cylinder 6 is connected above and below the piston 7 to a pressurized oil source and to the outside respectively, and vice versa, by the distributor valve 15 and the pipes 151 and 152.

After the soft material has been loaded into the cavity of the mould 10 the press cross-member is lowered until the punch 5 enters the mould cavity. During this first pressing stage the punch portions 51 and 52 are coplanar.

With the punch in this condition, a first pressing, a deaeration operation and a second pressing at a maximum press thrust are carried out.

Figure 3:
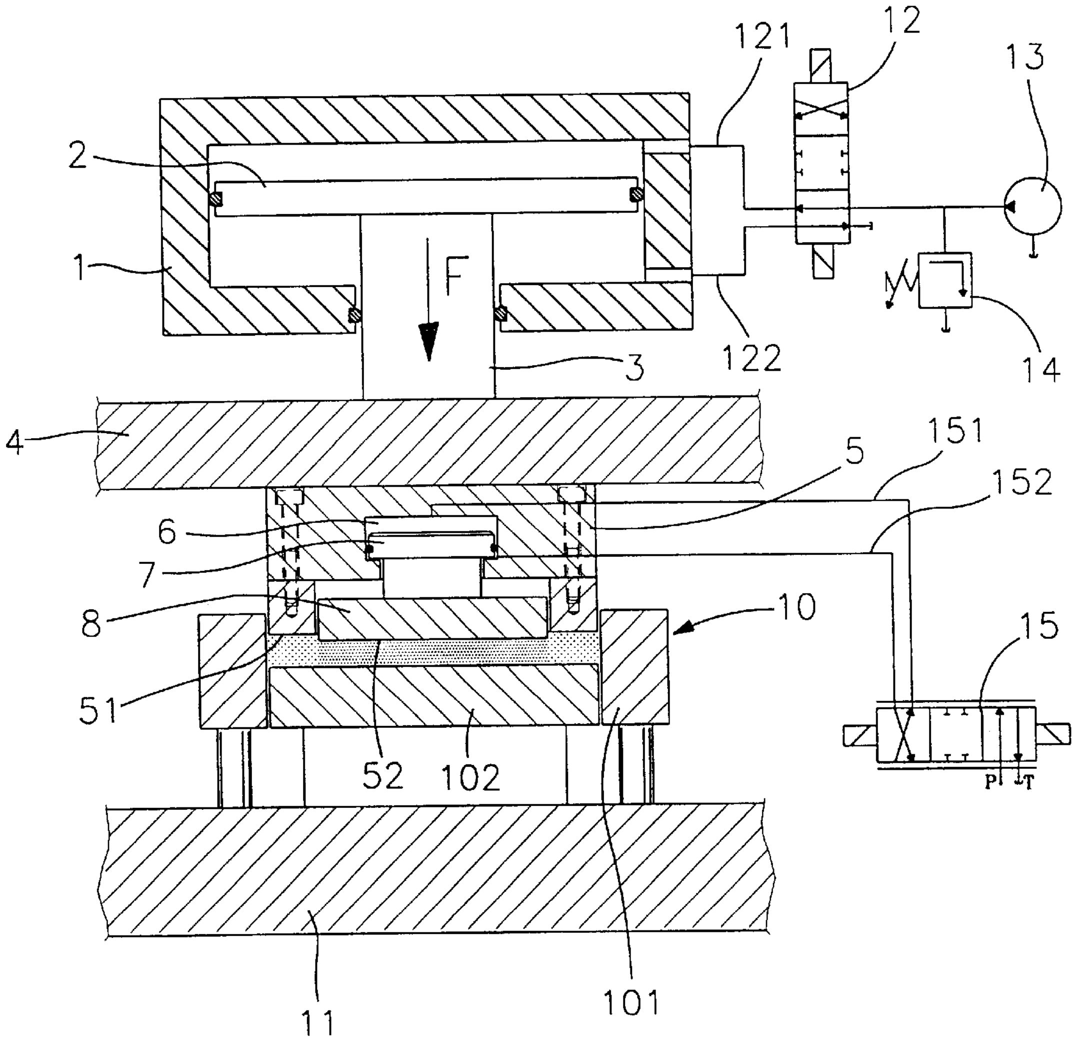
FIG. 3 shows the press of FIG. 1 in a second operating position.

The piston 2 is kept fed while descending, with the distributor valve 12 positioned as in FIG. 3, and the cylinder at the maximum pressure set by the maximum pressure valve 14.

At this point the secondary cylinder is fed to cause the piston 7 to descend, by setting the distributor valve 15 to the position shown in FIG. 3.

The portion 52 of the punch 5 is lowered to exert on the powder a pressure equal to the pressure of the hydraulic fluid in the cylinder multiplied by the ratio of the areas of the cylinder 6 and punch portion 52.

During this stage there is exerted on the main piston 2 the sum of two reactions, namely that relative to the thrust of the punch portion 51 on the powder and that relative to the thrust of the punch 52 on the powder.

As thrust of the punch portion 52 increases, that of the portion 51 decreases until it becomes zero when the thrust of the punch portion 52 equals that exerted by the main piston.

Any further increase in the pressure of the hydraulic fluid in the piston 6 would cause the cross-member and main piston to rise because the pressure within the main cylinder cannot increase beyond the setting of the maximum pressure valve 14.

Figure 4:
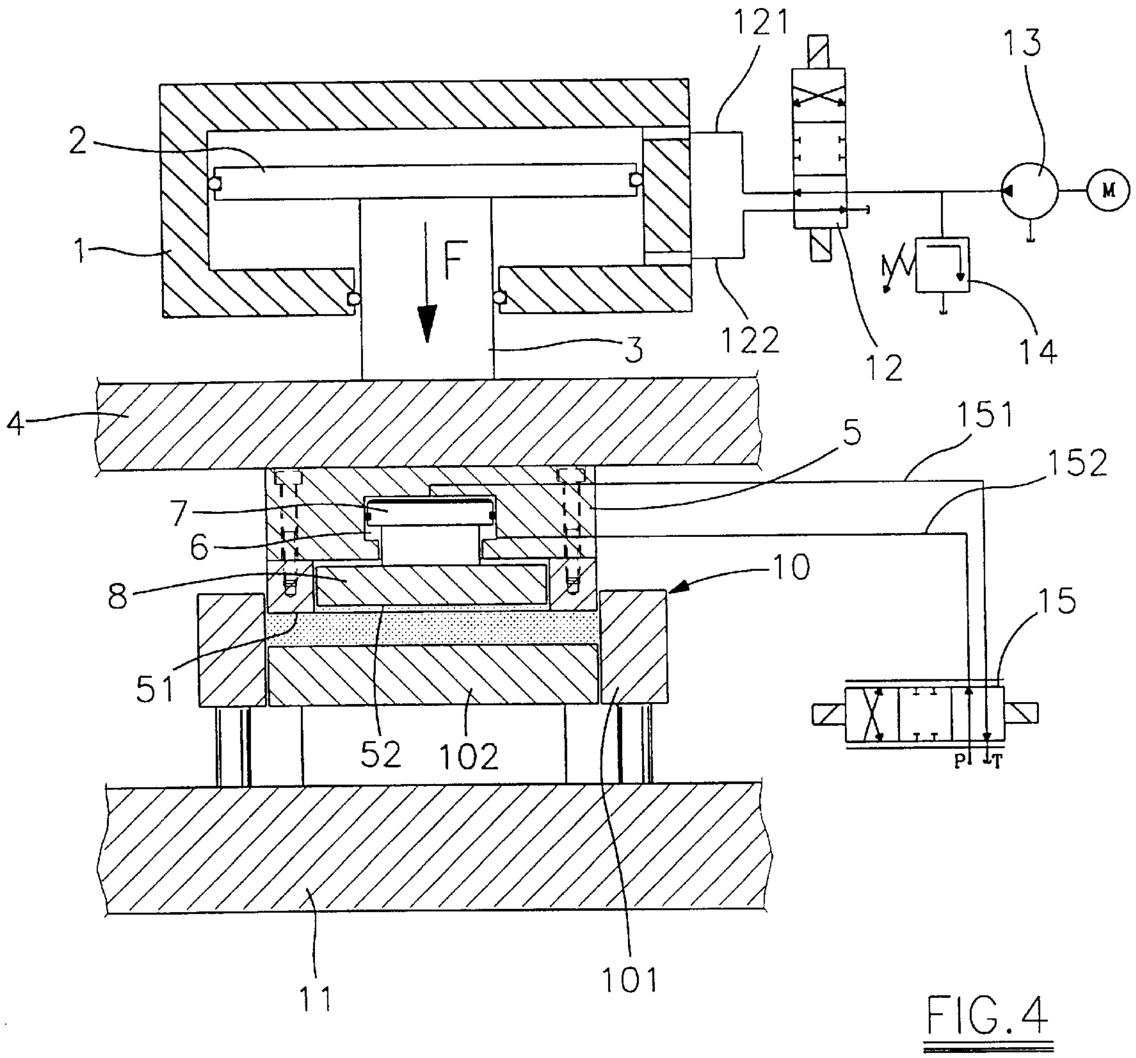
FIG. 4 shows the press of FIG. 1 in a third operating position.

At this point the command to the distributor valve 15 is reversed to discharge the secondary cylinder 6, as shown in FIG. 4, so that the thrust on the punch portion 52 becomes zero.

The main piston exerts the entire thrust F on the portion 51 of the punch 5, which is then subjected to a pressure equal to F divided by the area of the portion 51 of the punch 5.

If the area of the portion 51 is equal to one half the area of the entire punch 5, the thrust F is double the thrust which would be exerted by the entire punch.

The operation is conducted such that generally the two punch areas, upon termination of pressing, have exerted the same compacting pressure on the entire tile surface.

The final tile compacting pressure can also be reached by partial pressure increases, first on one punch portion and then on the other.

Figure 5:
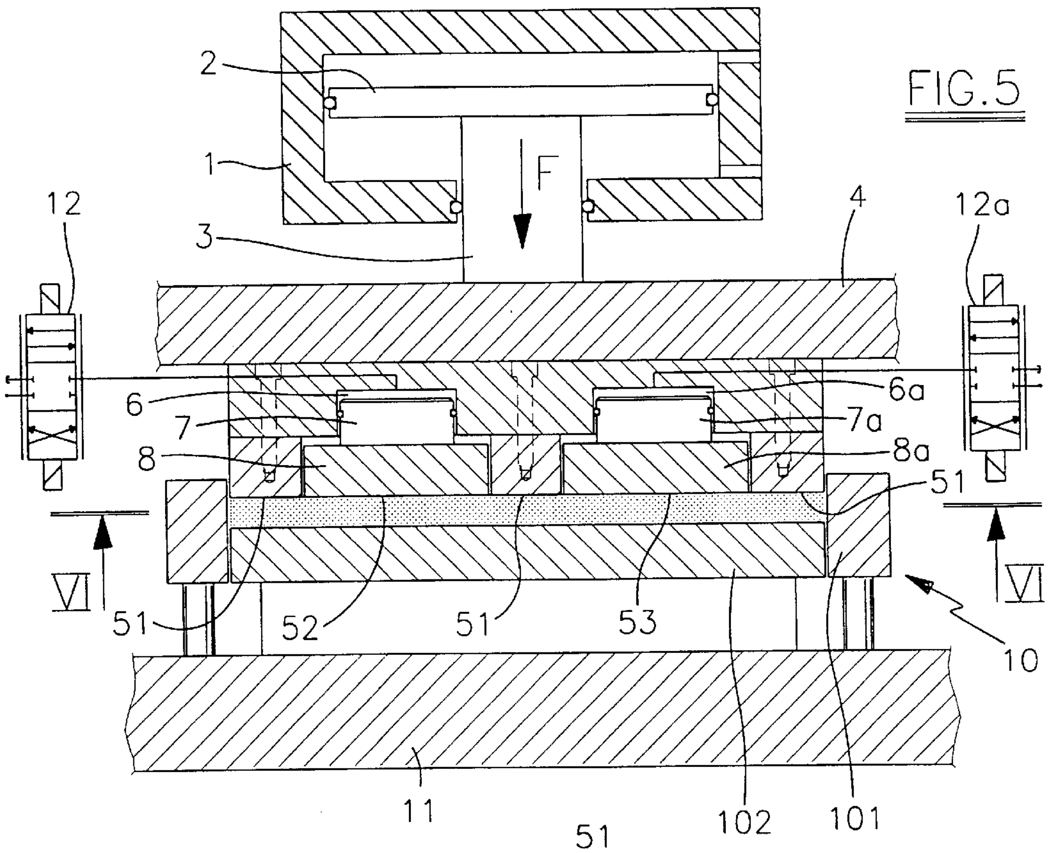
FIG. 5 is a schematic section through a second embodiment of a press with a relative mould for implementing the invention, shown in a first operating position.
Figure 6:
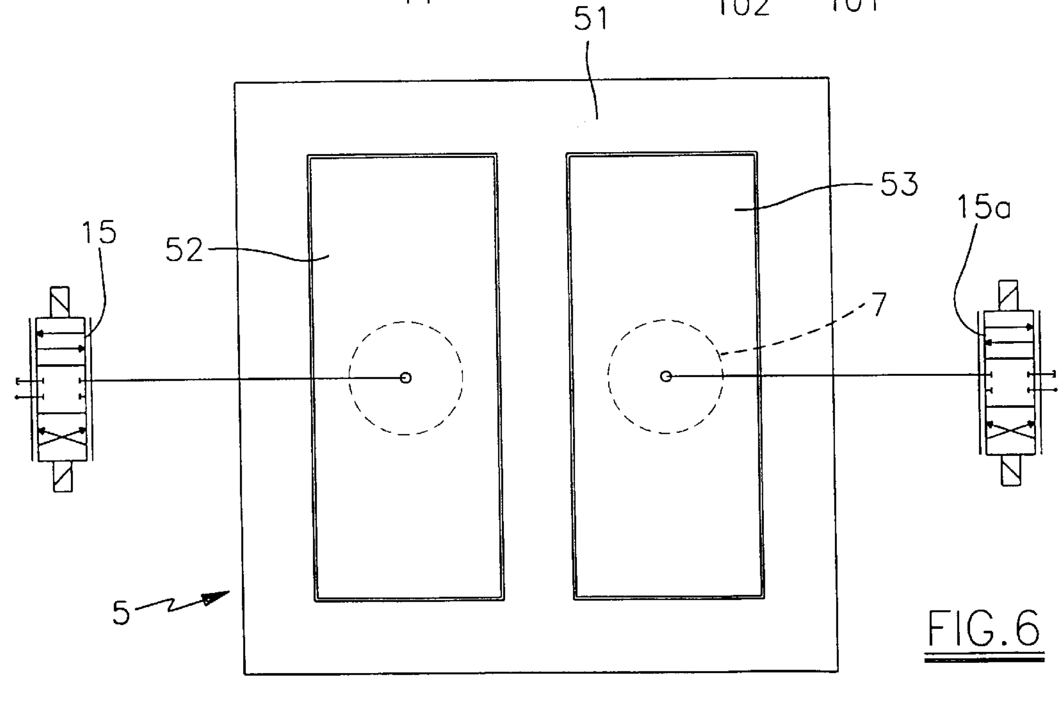
FIG. 6 is a partial view along line VI—VI of FIG. 5.

FIGS. 5 and 6 show a second embodiment of the present invention in which the punch is divided into three portions having areas of the same order of magnitude, and preferably equal.

The characteristics and operation of said second embodiment are apparent, it being sufficient to note that via the cross-member 4, the main piston exerts a thrust which increases to a maximum value determined by the set value of the maximum pressure valve (not shown) positioned in the feed pipe to the main cylinder 1.

While the thrust transmitted by the cross-member increases, the cylinders 6 and 6*a* are fed alternately via the respective distributor valves 12 and 12*a* as shown in FIG. 5, to push against the punch portions 52 and 53. The surface division of the punch portions 51, 52 and 53 satisfies the criteria explained in the preceding embodiment.

Figure 7:
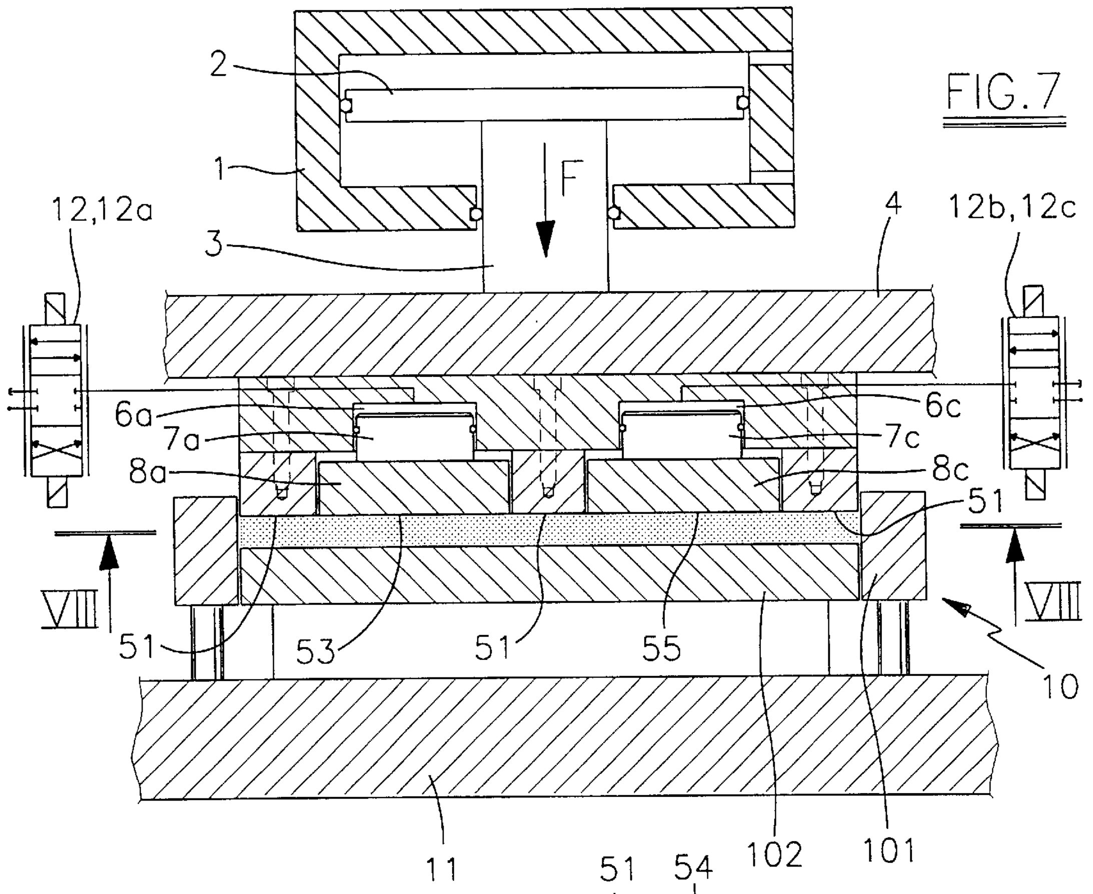
FIG. 7 is a schematic section through a third embodiment of a press with a relative mould for implementing the present invention, shown in a first operating position.
Figure 8:
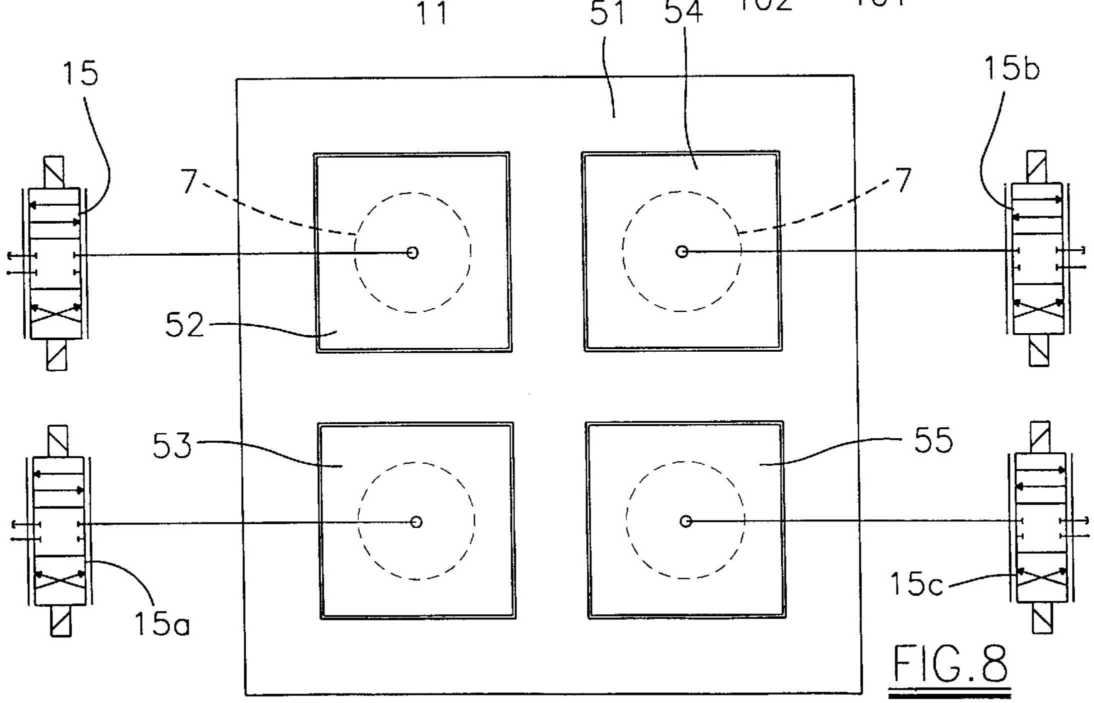
FIG. 8 is a partial view along line VIII—VIII of FIG. 7.

A third embodiment of the present invention is shown in FIGS. 7 and 8, in which the same reference numerals as FIGS. 1 to 4 are used to indicate corresponding elements. These figures show a punch 5 divided into five portions 51, 52, 53, 54 and 55, each operated by a cylinder-piston unit 6, 6*a*, 6*b* and 6*c* respectively.

Operation common to two or more portions can also be used to achieve their synchronized movement. The punch can be divided into any number of variously distributed portions of any shape.

FIGS. 9 to 13 show a fourth embodiment of the present invention in which the pistons which press on the various portions into which the punch is divided are operated mechanically, using non-yieldable means such as cams, which by suitable control produce an alternate movement of the pistons.

In FIGS. 9 to 13 the same reference numerals as FIGS. 1 to 4 are used to indicate corresponding elements. These figures show schematically, a tile pressing mechanism acting in succession on several portions of the tile surface. The mechanism consists of a punch divided into two portions, namely an outer portion 51 rigidly connected to the movable cross-member 4, and an inner portion 52 operated by a cam 16 driven by a moving rack 17. Although the surface areas of the two portions can be different they are assumed to be the same and equal to one half of the entire punch surface area.

In the pressing cycle the initial stages take place in traditional manner. The carriage expels the tile and loads the powder into the mould cavity, and the movable cross-member carrying the upper punch is lowered so that the two punch portions penetrate into the cavity. During this stage the two punch portions are in the same plane.

After closing the mould the main pressing is carried out.

Figure 9:
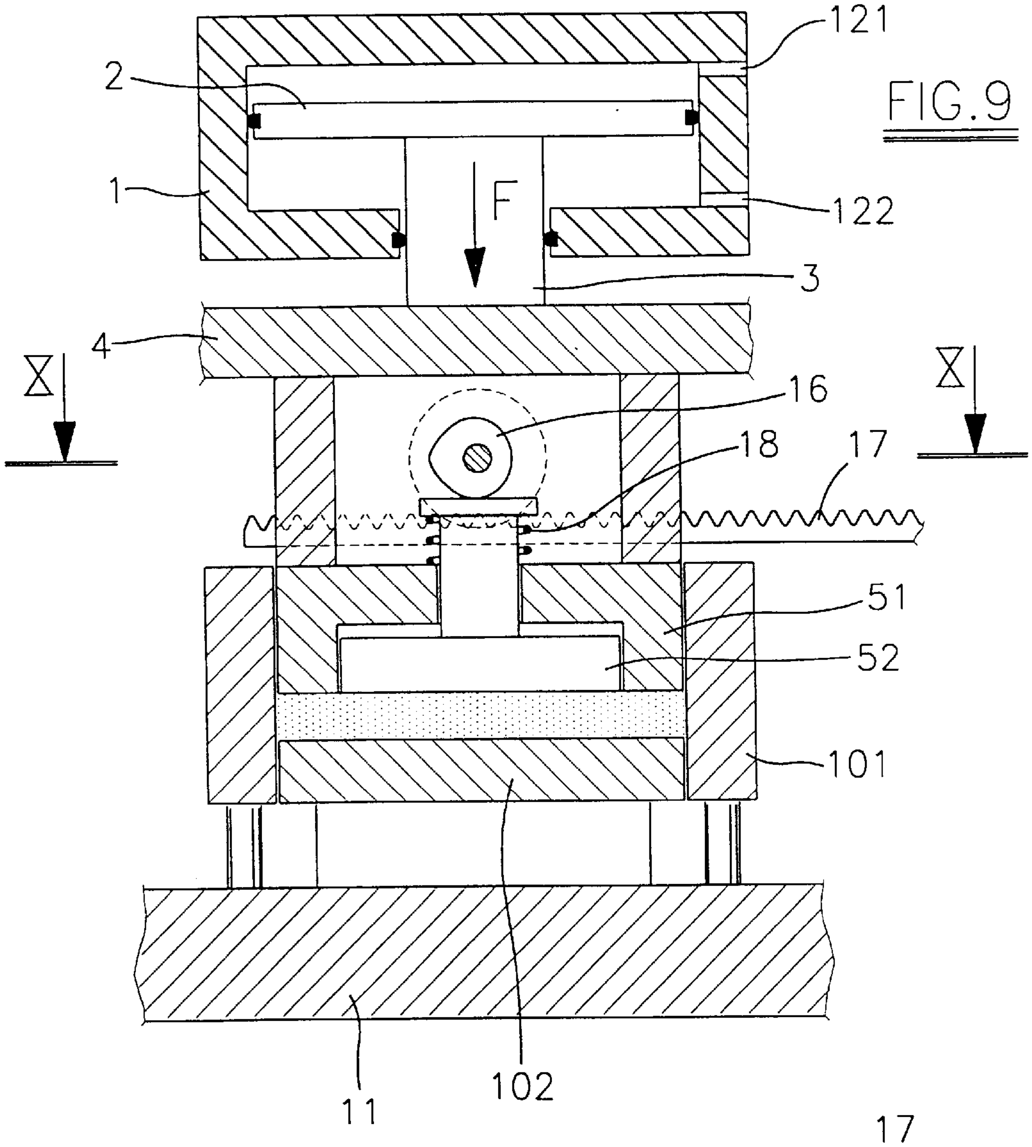
FIG. 9 is a schematic section through a fourth embodiment of a press with relative mould for implementing the invention, shown in a first operating position.
Figure 10:
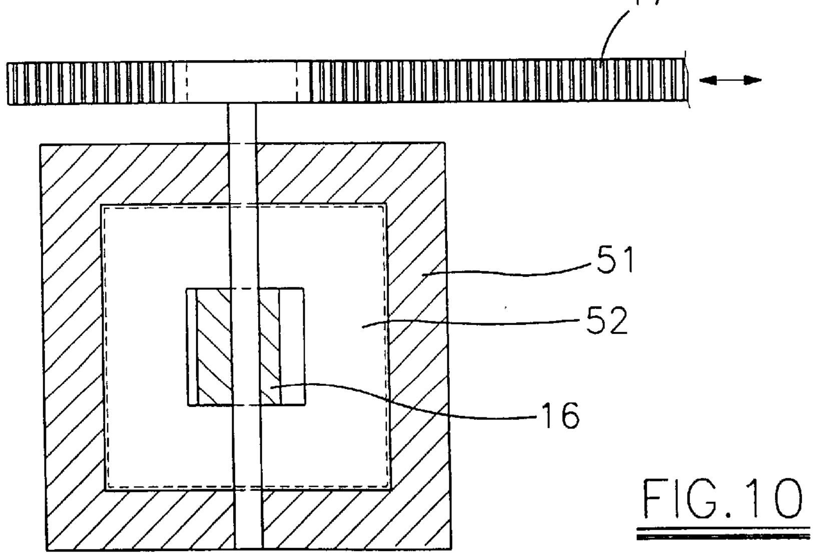
FIG. 10 is a partial view on the line X—X of FIG. 9.

In initial light pressing for removing air from the powder and increasing its density, the punch moves to press the entire surface. The portions 51 and 52 lie in the same plane and exert on the powder a light pressure equal at all points, as shown in FIG. 9.

A slackening stage within the press follows, with slight retraction of the punch to facilitate air escape from the compacted powder (deaeration).

Figure 11:
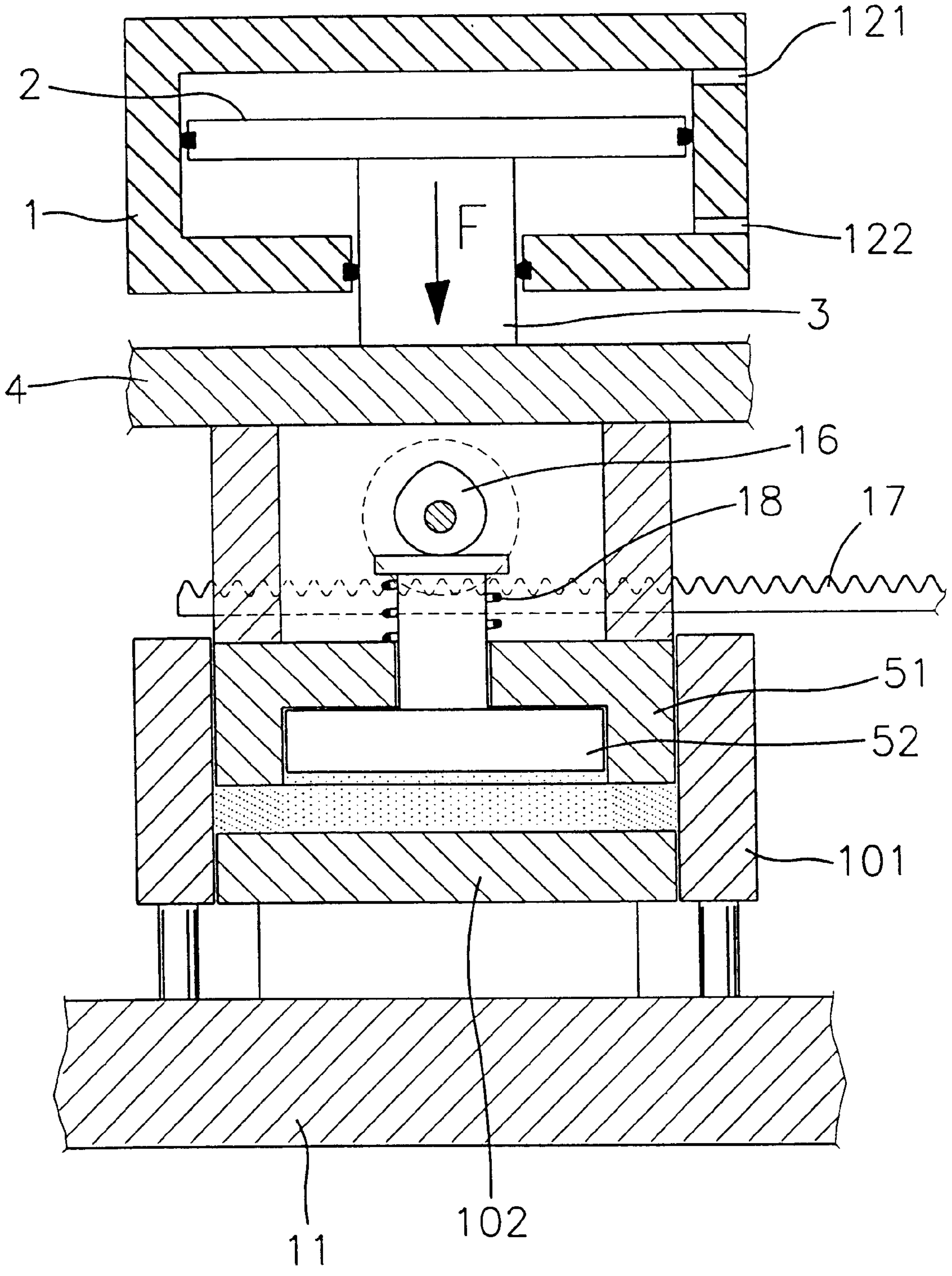
FIG. 11 shows the press of FIG. 9 in a second operating position.

The main pressing stage is then carried out. The rack 17 is moved to disengage the cam 16 from the inner part of the punch which, by the action of the spring 18, is returned upwards to remove the portion 52 from the powder, as shown in FIG. 11.

By means of the movable cross-member 4, a force F max is made to act on only the portion 51 of the punch, to obtain on the powder a doubling of the compacting pressure compared with traditional pressing in which the punch is in the form of a single rigid block which simultaneously compacts the entire tile surface.

The movable cross-member then undergoes a minimum upward travel to separate the punch from the powder.

Figure 12:
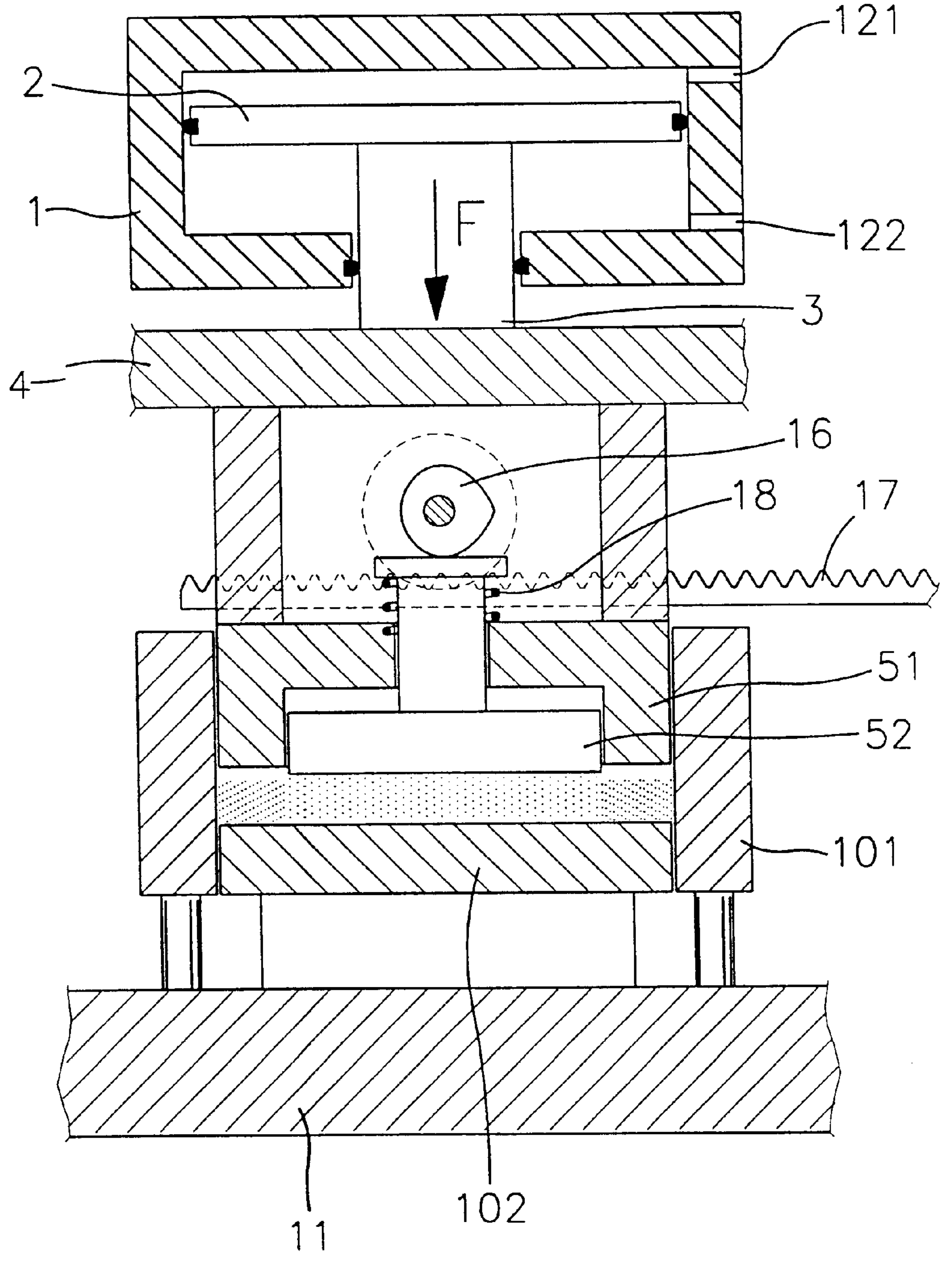
FIG. 12 shows the press of FIG. 9 in a third operating position.

The movement of the rack 17 causes the cam 16 to rotate and to move the punch portion 52 to a level forward of the punch portion 51 by a suitable distance, which can be adjusted by varying the extent of travel of the rack, as shown in FIG. 12.

Figure 13:
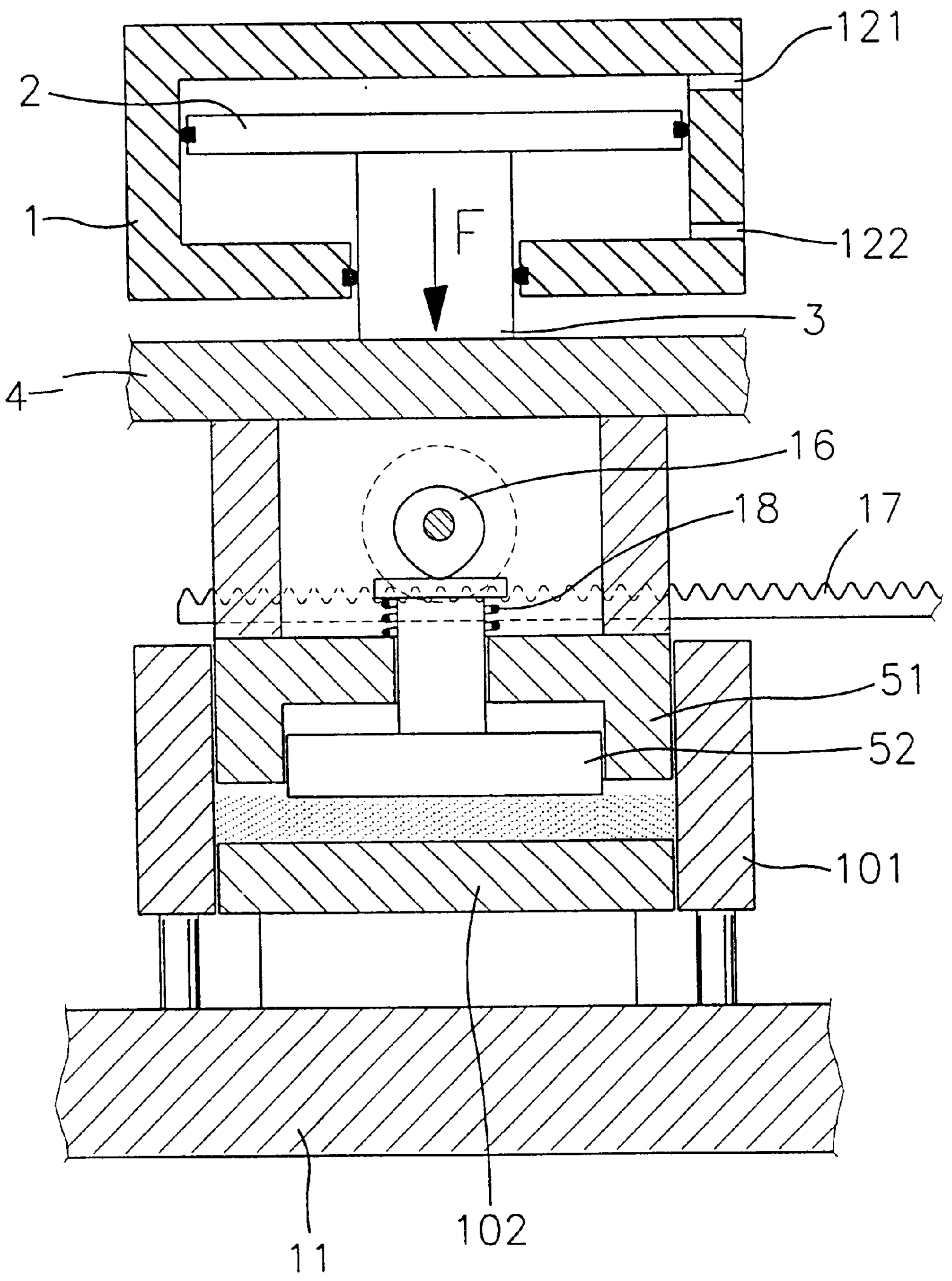
FIG. 13 shows the press of FIG. 9 in a fourth operating position.

The powder is then pressed, to now be compacted only by the punch portion 52, as shown in FIG. 13.

Again in this case a doubling of the compacting pressure is obtained compared with traditional pressing.

The procedure is continued by the alternate pressing by the punch portion 51 and pressing by the punch portion 52.

The thrust F exerted by the main press piston during these stages can either be gradually increased to maximum value or be maintained constant at a predetermined value, for example at the maximum thrust which the structure is able to withstand.

Basically, the punch can be divided into any number of portions, each operated by a suitable cam.

The pressing cycle is carried out in a manner similar to that heretofore described, by alternating the stages of powder compaction by the portions or groups of portions into which the punch is divided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for forming ceramic tiles which comprises:

an open mould chamber adapted to contain a contents of ceramic material;

a punch disposed above the open mould chamber, said punch being divided into a first punch portion and a second punch portion, said first and second punch portions having substantially the same surface area;

a main hydraulic cylinder, a first piston slidably disposed within the main hydraulic cylinder, said first piston being fixed to a cross-member which, in turn, is fixed to the first punch portion, a second piston slidably disposed within a secondary hydraulic cylinder defined by a cavity in said first punch portion, said secondary hydraulic cylinder containing a second piston slidably disposed therein, said second piston being fixed to said second punch portion, and distribution valves separately connected to the main hydraulic cylinder and secondary hydraulic cylinder for delivering pressurized hydraulic fluid to opposite sides of said respective pistons for moving the first and second punch portions, whereby said punch portions can be selectively operated, so as to define coplanar movement of the surface areas of said two punch portions or independent movement of said surface areas of said punch portions to be inward or outward of the coplanar position;

wherein in said independent movement one punch portion is active relative to the other punch portion.

2. The apparatus of claim 1, wherein a pressure valve of adjustable setting is disposed between the pressurized hydraulic fluid sources and the main hydraulic cylinder.

3. An apparatus for forming ceramic tiles which comprises:

an open mould chamber adapted to contain contents of ceramic material;

a punch disposed above the open mould chamber, said punch being divided into a first punch portion and a second punch portion, said first and second punch portions having substantially the same surface area;

a main hydraulic cylinder;

a first piston slidably disposed within the main hydraulic cylinder, said first piston being fixed to a cross-member which, in turn, is fixed to the first punch portion;

at least two secondary hydraulic cylinders with associated pistons disposed in cavities within the first punch portion, the respective associated pistons being connected to respective second punch portions, the total pressing area of which being of substantially the same magnitude as the pressing area of the first punch portion.

* * * * *